United States Patent
Coppin

(10) Patent No.: US 11,588,932 B2
(45) Date of Patent: Feb. 21, 2023

(54) ACTIVATING A CONNECTED FLIGHT MODE

(71) Applicant: Google LLC, Mountain View, CA (US)

(72) Inventor: Maxim Coppin, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/292,733

(22) PCT Filed: Feb. 28, 2019

(86) PCT No.: PCT/US2019/020087
§ 371 (c)(1),
(2) Date: May 11, 2021

(87) PCT Pub. No.: WO2020/176107
PCT Pub. Date: Sep. 3, 2020

(65) Prior Publication Data
US 2021/0400133 A1    Dec. 23, 2021

(51) Int. Cl.
*H04M 1/72463* (2021.01)
*H04M 1/72454* (2021.01)
(Continued)

(52) U.S. Cl.
CPC ... *H04M 1/72463* (2021.01); *H04M 1/72454* (2021.01); *H04M 1/72457* (2021.01);
(Continued)

(58) Field of Classification Search
CPC ......... H04M 1/72463; H04M 1/72454; H04M 1/72457; H04M 2250/02; H04M 2250/06;
(Continued)

(56) References Cited

U.S. PATENT DOCUMENTS 9,170,822 B1 * 10/2015 Sharkey ................ G06F 1/3203
9,204,472 B1 * 12/2015 Boyle .................... H04W 76/11
(Continued)

OTHER PUBLICATIONS

Anonymous, "System checkup, keep tabs on background data usage—Android customization—Android Authority", Jun. 18, 2015, URL://https://www.androidauthority.com/system-checkup-background-data-android-customized-617858 (retrieved Oct. 16, 2019).
(Continued)

*Primary Examiner* — Minjung Kim
(74) *Attorney, Agent, or Firm* — McDonnell Boehnen Hulbert & Berghoff LLP

(57) ABSTRACT

In general, the subject matter described in this disclosure can be embodied in methods, systems, and program products for determining, by a mobile computing device while a cellular connection mode remains activated and a second wireless connection mode remains activated, that a sensor of the mobile computing device has detected information indicating that the mobile computing device is located on an airplane. The mobile computing device transitions, in response to having determined that the sensor has detected information indicating that the mobile computing device is located on the airplane, the mobile computing device into a connected flight mode, including by terminating the cellular connection mode while allowing the second wireless connection mode to remain activated.

27 Claims, 7 Drawing Sheets

(51) Int. Cl.
*H04M 1/72457* (2021.01)
*H04W 4/02* (2018.01)
*H04W 4/029* (2018.01)

(52) U.S. Cl.
CPC ........... *H04W 4/027* (2013.01); *H04W 4/029* (2018.02); *H04M 2250/02* (2013.01); *H04M 2250/06* (2013.01); *H04M 2250/12* (2013.01)

(58) Field of Classification Search
CPC .. H04M 2250/12; H04W 4/027; H04W 4/029
See application file for complete search history.

(56) References Cited

U.S. PATENT DOCUMENTS

| | | | |
|---|---|---|---|
| 9,538,446 B1* | 1/2017 | Kaushik | H04B 17/318 |
| 2012/0108269 A1 | 5/2012 | Howarter | |
| 2014/0187222 A1* | 7/2014 | Lai | H04M 1/724 |
| | | | 455/418 |
| 2018/0338003 A1* | 11/2018 | Carlson | H04W 4/70 |
| 2021/0337464 A1* | 10/2021 | Gupta | H04W 52/285 |

OTHER PUBLICATIONS

International Search Report and Written Opinion for corresponding PCT application No. PCT/US2019/020087, dated Dec. 17, 2019.

\* cited by examiner

ACTIVATING A CONNECTED FLIGHT MODE

CROSS REFERENCE TO RELATED APPLICATIONS

The present application claims priority as a U.S. national stage entry of PCT application serial no. PCT/US2019/020087 filed Feb. 28, 2019. The full disclosure of PCT/US2019/020087 is incorporated herein by reference.

TECHNICAL FIELD

This document generally relates to activating a connected flight mode.

BACKGROUND

Airplane mode is available on smartphones and other portable computers to suspend radio-frequency signal transmission. When activated, the airplane mode disables cellular network transmission, Wi-Fi, and Bluetooth all at once. Some airliners allow passengers to use Wi-Fi or Bluetooth during a flight but still prohibit the use of a cellular network connection for calling, messaging, and other cellular data network features.

SUMMARY

This document describes techniques, methods, systems, and other mechanisms for activating a connected flight mode in which a portable computing device operates to optimize network connections and device operations while on an airplane.

Typically an airplane mode can be activated by a manual switch to disable all radio-frequency communications. Although use of some radio-frequency connections, such as inflight Wi-Fi and Bluetooth, have been permitted and served by airlines during limited phases of flight, the manual selection of the airplane mode does not provide selective configurations of network connections desired by users, and the users may end up manually modifying individual settings. Moreover, users sometimes forget to switch airplane mode on and off when appropriate. Further, different types of portable devices, such as mobile phones, tablets, and laptops, can operate differently on each radio-frequency communication mode, such as with a Wi-Fi network communication mode or a cellular network communication mode. However, typical airplane modes do not distinguish different types of portable devices. Moreover, availability of a mode of radio-frequency communication, such as Wi-Fi, has typically been determined as a binary decision, and portable devices may not modify characteristics of radio-frequency communications when in an airplane mode (e.g., speed of communication, etc.). For example, if an inflight Wi-Fi connection is available, a computing device may operate as if the inflight Wi-Fi provides a same level of high bandwidth and un-metered use as other, ground-based Wi-Fi networks, and as such may not treat the inflight Wi-Fi differently than other Wi-Fi networks. Therefore, processes which use a lot of bandwidth, such as photo backups, may still execute while on a flight regardless of actual flight network capacities and qualities, and thus can take up a significant amount of the limited resources of the plane's internet connectivity. The disclosed technology can automatically switch a connected flight mode on before or during a flight to provide portable computing devices with granular levels of connectivity.

In some example implementations, the disclosed technology can detect one or more triggering factors indicative of a user device being on a flight or about to be on a flight, and, based on the detected the triggering factors, switch the user device from a normal operational mode to a connected flight mode. Examples of such triggering factors include environmental factors, radio-frequency signal factors, and contextual factors. In addition, a manual override input from a user may turn on the connected flight mode. When one or more of the triggering factors are detected, the portable computing device can switch to a connected flight mode. A user device, in a connected flight mode, may modify the normal operation of one or more wireless connections or applications.

As additional description to the embodiments described below, the present disclosure describes the following embodiments.

Embodiment 1 is a computer-implemented method. The method comprises establishing, by a mobile computing device, a first wireless connection with a cellular network while a cellular connection mode of the mobile computing device is activated. The method comprises establishing, by the mobile computing device, a second wireless connection with a wirelessly-communicating device while a second wireless connection mode of the mobile computing device is activated. The method comprises determining, by the mobile computing device while the cellular connection mode remains activated and the second wireless connection mode remains activated, that a sensor of the mobile computing device has detected information indicating that the mobile computing device is located on an airplane. The method comprises transitioning, by the mobile computing device in response to having determined that the sensor has detected information indicating that the mobile computing device is located on the airplane, the mobile computing device into a connected flight mode, including by terminating the cellular connection mode while allowing the second wireless connection mode to remain activated.

Embodiment 2 is the computer-implemented method of embodiment 1, wherein: the sensor includes a pressure sensor; and determining that the sensor of the mobile computing device has detected information indicating that the mobile computing device is located on the airplane includes the mobile computing device detecting an atmospheric pressure being lower than a predetermined threshold value.

Embodiment 3 is the computer-implemented method of any preceding embodiment, wherein transitioning the mobile computing device into the connected flight mode comprises transitioning the mobile computing device from a state in which automatic application backups are permitted to a state in which the automatic application backups are not permitted.

Embodiment 4 is the computer-implemented method of any preceding embodiment, wherein transitioning the mobile computing device into the connected flight mode comprises transitioning the mobile computing device from a state in which automatic background application refresh is permitted to a state in which the automatic background application refresh is not permitted.

Embodiment 5 is the computer-implemented method of any preceding embodiment, wherein transitioning the mobile computing device into the connected flight mode comprises transitioning the mobile computing device from a state in which automatic application updates are permitted to a state in which the automatic application updates are not permitted.

Embodiment 6 is the computer-implemented method of any preceding embodiment, wherein the second wireless connection with the wirelessly-communicating device is a Bluetooth wireless connection.

Embodiment 7 is the computer-implemented method of any of embodiments 1 to 5, wherein the second wireless connection with the wirelessly-communicating device is a Wi-Fi wireless connection.

Embodiment 8 is the computer-implemented method of embodiment 7, wherein transitioning the mobile computing device into the connected flight mode comprises transitioning the mobile computing device from a state in which the Wi-Fi wireless connection is automatically disconnected if a quality of connection available via the Wi-Fi wireless connection is below a first threshold value, to a state in which the Wi-Fi wireless connection is automatically disconnected if a quality of connection available via the Wi-Fi wireless connection is below a second threshold value that is different from the first threshold value.

Embodiment 9 is the computer-implemented method of embodiment 7 or embodiment 8, wherein transitioning the mobile computing device into the connected flight mode comprises transitioning the mobile computing device from a state in which a captive portal for log-in is provided for a first period of time on the mobile computing device, to a state in which the captive portal for log-in is provided for a second period of time that is shorter than the first period of time, wherein the mobile computing device disconnects the Wi-Fi wireless connection after the second period of time while the mobile computing device is in the connected flight mode.

Embodiment 10 is the computer-implemented method of any preceding embodiment, further comprising: determining, by the mobile computing device in the connected flight mode, that the sensor of the mobile computing device has detected information indicating that the mobile computing device is located off the airplane; and transitioning, by the mobile computing device in response to having determined that the sensor detected information indicating that the mobile computing device is located off the airplane, the mobile computing device into a normal mode, including by enabling the cellular connection mode while leaving the second wireless connection mode activated.

Embodiment 11 is the computer-implemented method of embodiment 10, further comprising receiving, by the mobile computing device, a user input to switch the mobile computing device from the normal mode to the connected flight mode.

Embodiment 12 is directed to a computing system that includes one or more processors, and one or more computer-readable devices having instructions stored thereon, that when executed by the one or more processors, cause the performance of actions according to the method of any one of embodiments 1 toll.

Particular implementations can, in certain instances, realize one or more of the following advantages. The disclosed technology provides a connected flight mode that automatically switches on and/or off. Employing connected flight mode can enhance network use among multiple users of limited inflight network resources. For example, the connected flight mode of the present disclosure can maximize utilization of an inflight Wi-Fi network by allocating more Wi-Fi resources to devices performing important or time-critical network tasks than devices simply sitting on the Wi-Fi network or performing tasks determined to be non-important or non-time-critical. Further, the granular configuration of settings according to the disclosed technology can improve battery usage on portable computing devices The details of one or more implementations are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

This document generally describes activating a connected flight mode on a portable computing device. In general, a portable computing device detects one or more factors that can trigger a connected flight mode. The portable computing device analyzes the one or more detected factors and switches its operational mode to the connected flight mode based on the analysis. The connected flight mode provides granular settings of the portable computing device that improve efficient use of limited network resources among multiple users on the plane.

Figure 1:
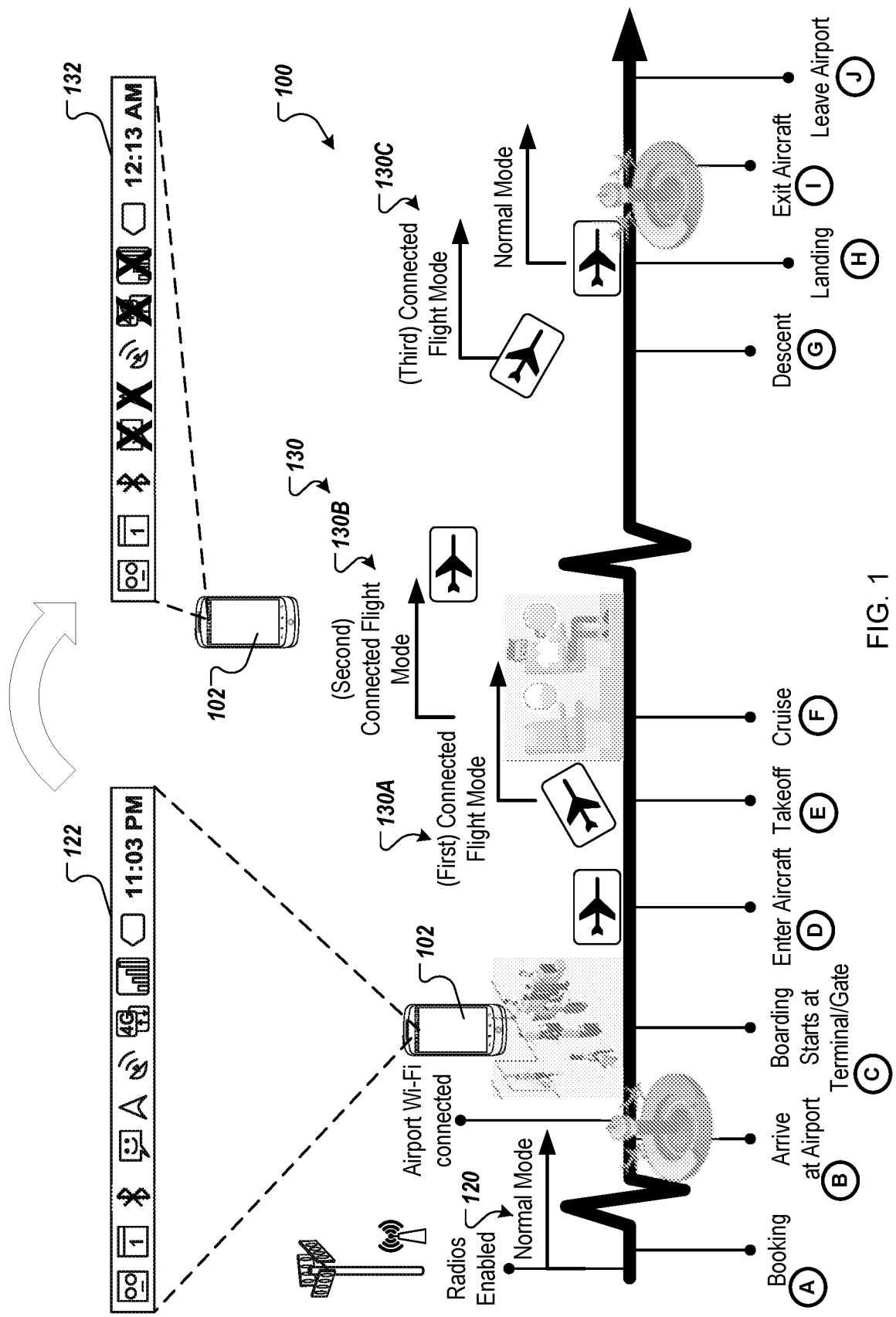
FIG. 1 is an example timeline to illustrate different operational modes of a portable computing device over different stages of flight travel.

FIG. 1 is an example timeline 100 to illustrate different operational modes of a portable computing device over different stages of flight travel. The operational modes of a portable computing device include a normal mode 120 and a connected flight mode 130.

The normal mode 120 is an operational mode in which the portable computing device 102 operates with full capability. For example, in the normal mode 120, the portable computing device 102 can operate with all available radio-frequency communications enabled (e.g., cellular, Wi-Fi, Bluetooth, GPS, etc.), as illustrated in an example status bar 122 shown in a display screen of the portable computing device 102.

The connected flight mode 130 is an operational mode in which the portable computing device 102 operates with limited capability. For example, in the connected flight mode 130, the portable computing device 102 can operate with no or only a limited number of radio-frequency communications enabled (e.g., Wi-Fi, Bluetooth, GPS, etc.) while the other radio-frequency communications (e.g., cellular network communications) are disabled, as illustrated in an example status bar 132 in a display screen of the portable computing device 102.

A portable computing device 102 (also referred to as a mobile computing device) can be located in different places or spaces throughout different stages of a flight travel. As described herein, the portable computing device 102 can transition among different operational modes, such as between the normal mode 120 and the connected flight mode 130, based on a variety of factors that may vary over the course of flight travel. Examples of such factors include locations, altitudes, pressures, speeds, and sounds which are detectable during different stages of flight travel, as discussed below.

A flight traveler may start by booking a flight ticket (Stage A). A user may use a portable computing device 102 or other computing devices for booking. On the date of flight, the user arrives at an airport a few hours prior to a scheduled flight time (Stage B), where the user checks in and collects a boarding pass, checks any baggage, and goes through a security screening checkpoint. The user then comes to a departure gate at a terminal for boarding on the plane (Stage C). During the boarding, the user enters a cabin of the aircraft and take a reserved seat (Stage D).

The aircraft flight includes multiple phases of flight, such as taxiing, takeoff, cruise, descent, and landing, which lead to, for example, various locations, altitudes, speeds, and sounds. At or after a scheduled departure time, the aircraft moves from the terminal to a runway by taxiing. The aircraft then takes off (Stage E), involving a transition from moving along the ground (taxiing) to flying in the air. Usually the engines are run at full power during takeoff. Before takeoff, the engines are routinely run up to high power to check for engine-related problems, making a considerable noise. When a pilot releases the brakes, the aircraft starts accelerating until a necessary speed for takeoff is achieved. The takeoff speed required for takeoff varies with air density, aircraft gross weight, aircraft configuration, wind speed, wind direction, and other variables. By way of example, typical takeoff air speeds for jetliners are in a range of 150-180 mph, and light aircrafts can take off at around 60-100 mph. Further, during takeoff, the aircraft experiences atmospheric pressure drop.

Following takeoff, the aircraft climbs to a certain altitude before cruising at this altitude (Stage F). Typical cruising altitude for commercial jets varies in a range of, for example, 30,000-42,000 feet. Typical cruising speed for long-distance flights is around 500-600 mph. Approaching a destination, the airplane starts descending by decreasing altitude to get ready for landing (Stage G). During the descent phase, the engine noise diminishes as the engines are operated at low power settings. However, towards the end of the descent phase, the aircraft may accelerate and increase a noise to realize a final approach before taking landing position.

Landing is the last part of a flight, where the aircraft returns to the ground (Stage H). At the beginning of the landing phase, the doors of landing gears open and make distinct audible sounds in the cabin. As the landing gear is deployed, they create an additional drag and an additional noise. Immediately after touch-down, the passengers can hear a blowing sound, sometimes with increasing engine sound. This is the engine's thrust reversers, helping the aircraft slow down to taxi speeds by redirecting the airflow of the engines forward. Once the aircraft is decelerated to low speed, it can taxi to a terminal building. Once the aircraft has parked at the terminal building, the passengers exit the aircraft cabin (Stage I), and finally leave an arrival airport (Stage J).

As a user has gone through different stages of travel (Stages A-I), one or more computing devices (including the portable computing device 102) that are carried by the user can be arranged at different locations and altitudes, move at different speeds, and monitor changing noises. As described herein, the computing devices (including the portable computing device 102) can switch at least between the normal mode 120 and the connected flight mode 130 based on detection of various factors, such as locations, altitudes, pressures, speeds, and noises, which are distinct from stage to stage.

Many airliners require passengers to switch their portable electronic devices to an airplane mode during at least part of the flight. For example, passengers may be required to turn on an airplane mode for their portable electronic devices at least from takeoff until landing (Stage E to Stage H). Therefore, in some example implementations, as illustrated in FIG. 1, the portable computing device 102 remains in the normal mode 120 until the aircraft is about to take off. The portable computing device 102 can transition from the normal mode to the connected flight mode if the portable computing device is determined to meet a predetermined condition (e.g., if located on or near an airplane, if takeoff is about to start or has just started, etc.). In the illustrated example of FIG. 1, where an airplane mode is required to be turned on prior to takeoff, the portable computing device 102 switches to the connected flight mode if the portable computing device detects one or more factors indicative of preparation for or beginning of takeoff.

The portable computing device 102 can switch back to the normal mode if the portable computing device is determined to return to a condition that allows the portable computing device to operate in the normal mode. In the illustrated example of FIG. 1, the portable computing device 102 switches back to the normal mode at or shortly after landing.

Figure 5:
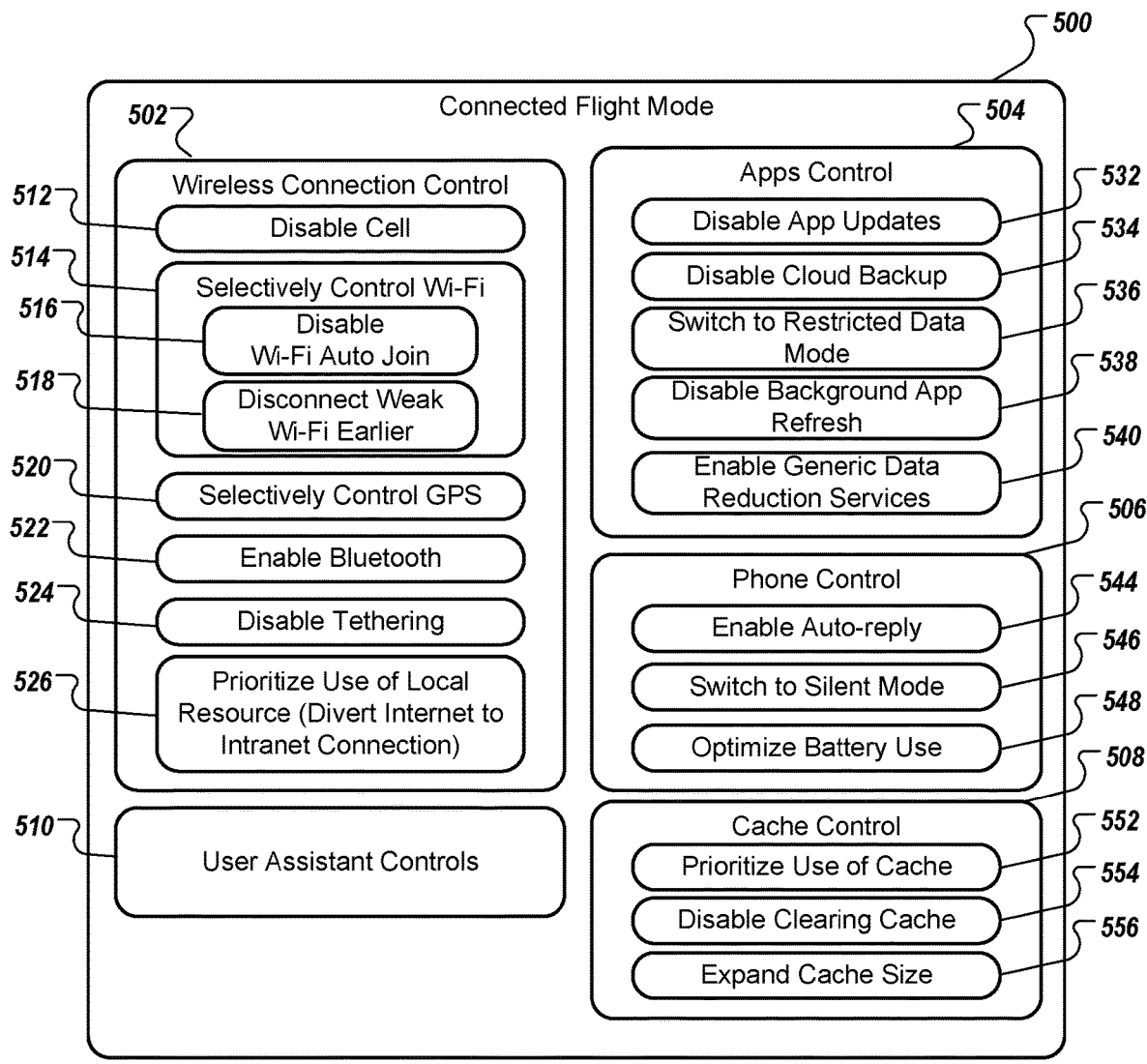
FIG. 5 is a block diagram that illustrates events that occur in a connected flight mode.

In some example implementations, the connected flight mode 130 can have a plurality of different connected flight modes, such as first, second, and third connected flight mode 130A, 130B, and 130C in FIG. 1, for example. Each of the different connected flight modes 130 can be triggered at different stages of travel and/or upon detection of different triggering factors. Each of the connected flight modes 130 can be configured to provide one or more different events (e.g., one or more settings or actions as illustrated in FIG. 5) than the other connected flight modes 130.

Figure 2:
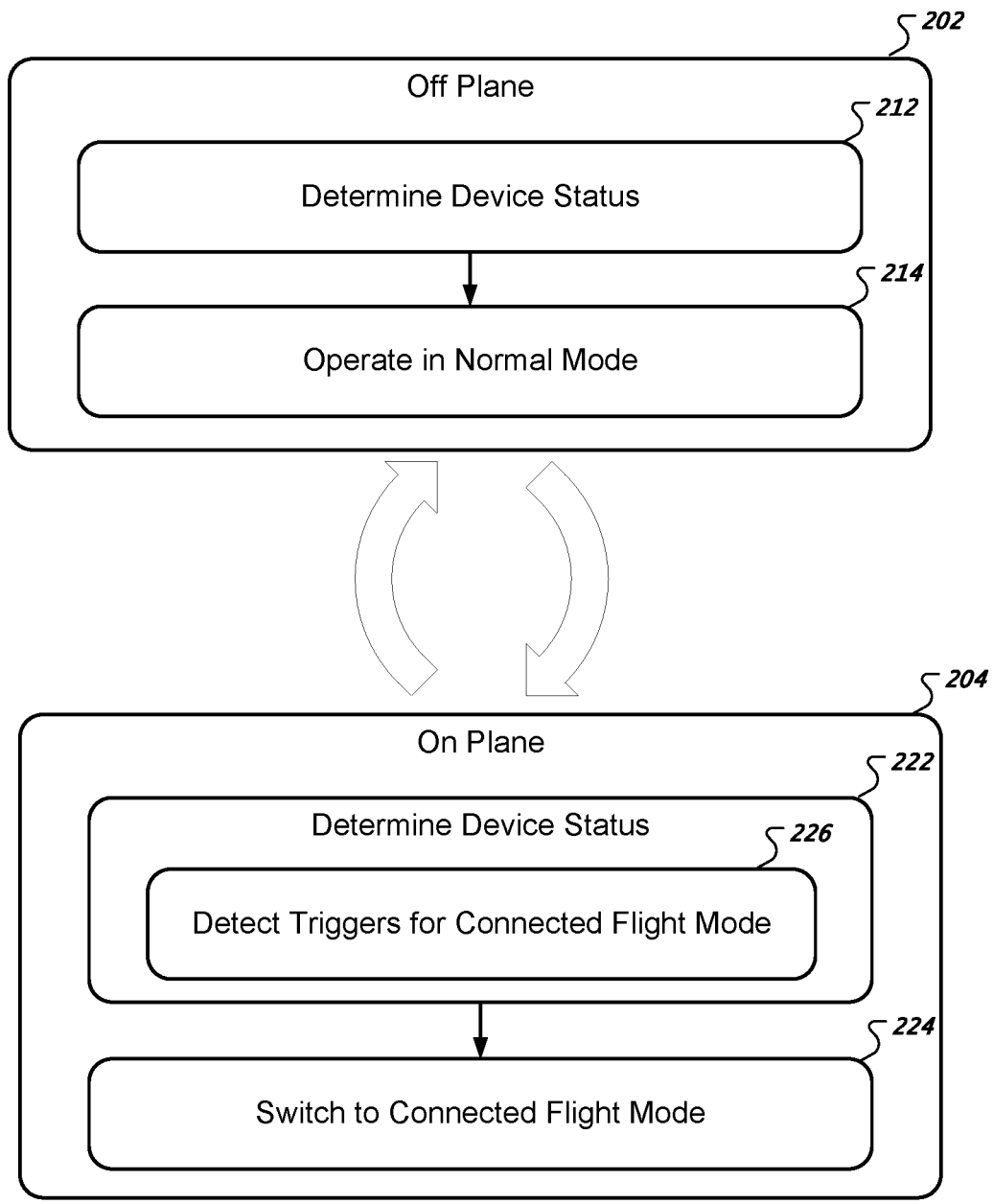
FIG. 2 illustrates two different operational modes of a portable computing device.

FIG. 2 illustrates two different operational modes of a portable computing device that switch to one another depending on where the portable computing device is detected to be located. In some implementations, the portable computing device 102 can operate in the normal mode when not located in an airplane (box 202), and switch to the connected flight mode when located in an airplane (box 204). The portable computing device 102 that invokes and operates under the constraints of the connected flight mode can return to the normal mode if it is determined to be located off an airplane (box 202).

While located off an airplane (box 202), the portable computing device 102 can determine a device status (box 212) by detecting one or more predetermined factors. If the device status indicates that the portable computing device 102 is off an airplane, the portable computing device 102 can operate in the normal mode (box 214). In the normal mode 120, the portable computing device 102 can establish multiple types of wireless connections as such wireless connection modes are enabled, such as cellular network, Wi-Fi network, Bluetooth, GPS, NFC, and other available wireless connections.

While located in an airplane, the portable computing device 102 continues to determine a device status (box 222)

by detecting one or more predetermined factors. If the device status indicates that the portable computing device 102 is in an airplane, the portable computing device 102 can operate in the connected flight mode (box 224). In the connected flight mode 130, the portable computing device 102 can disable one or some of the wireless connection modes while maintaining the other wireless connection modes. By way of example, the connected flight mode 130 can cause the portable computing device 102 to deactivate the cellular connection mode while keeping the Wi-Fi mode activated.

Deactivating a wireless connection mode can involve terminating a wireless communication link that employs the corresponding mode or, if there is no currently operating a wireless communication link that employs the corresponding mode (e.g., because there are no base-stations available), switching the portable computing device 102 into a state in which it will not automatically connect when a base station becomes available. A wireless connection mode being activated involves the portable computing device 102 operating a wireless communication link using the corresponding mode and/or the portable computing device 102 being in a state in which the device 102 automatically connects when a base station becomes available. Some devices provide a panel that a user can access by swiping his or her finger down from a top portion of a display, and that panel may include an interface element for each of various wireless connection modes to toggle with a single finger press between activating and de-activating the respective wireless connection mode.

In some implementations, the portable computing device 102 can determine a device status by detecting one or more factors that can either trigger the connected flight mode (box 226) or return to the normal mode. The detected factors can then be evaluated to determine whether the portable computing device 102 is in an airplane. Examples of such factors are described in more detail herein, for example with reference to FIG. 4.

The device status can be determined by detecting one or more factors associated with the portable computing device 102. The detected factors can be evaluated to determine whether the portable computing device 102 is in or outside an airplane. To detect the factors, the portable computing device 102 can use one or more sensors, which may be included in the portable computing device 102, or separately configured and connected to the portable computing device 102. Examples of the sensors include one or more position and movement sensors, one or more optical sensors, one or more acoustical sensors, a thermometer, and a user input detector.

The position and movement sensors are configured to detect movement, position (including altitude), and/or orientation of the portable computing device. As an example, the position and movement sensors determine an orientation of the portable computing device with respect to a primary direction of gravitational acceleration. The position and movement sensors can detect changes in the determined orientation and interpret those changes as indicating movement of the portable computing device. In some embodiments, the position and movement sensors include one or more accelerometers, gyroscopes, magnetometers, GPS receivers, altimeters, odometers, speedometers, shock detectors, vibration sensors, and proximity sensors.

The optical sensors are configured to detect optical signals proximate the portable computing device 102. In some embodiments, the optical sensors include one or more light sensors and/or infrared sensors. For example, a light sensor can be used to determine various properties of the environment proximate the portable computing device, such as the brightness and primary frequency (or color or warmth) of the light in the environment proximate the portable computing device. These properties of the sensed light may then be used to infer whether the portable computing device is in an indoor environment (such as in an aircraft cabin), an outdoor environment, etc.

The acoustical sensors are configured to detect sounds proximate the portable computing device 102. In some embodiments, the acoustical sensors include one or more microphones. For example, the acoustical sensors may capture a recording of sounds from proximate the portable computing device. The acoustical sensors can determine various sound properties about the sounds proximate the portable computing device such as volume, dominant frequency or frequencies, etc. These sound properties may be used to make inferences about the environment proximate to the portable computing device such as whether the sensed sounds are likely to correspond to sound characteristics in an indoor environment (such as in an aircraft cabin), an outdoor environment, etc.

The sensors of the portable computing device can detect factors at various times. The sensors of the portable computing device can be configured to obtain measurements at predetermined intervals. Alternatively and in addition, the sensors can be configured to monitor the factors in a continuous manner.

Although FIG. 2 illustrates an airplane as a reference location to implement and switch between different operational modes, it is understood that other locational references (e.g., an airport terminal gate) can also be used to divide locations for implementing different operational modes. In addition or alternatively, different timings of travel stages are used as a reference to implement and switch between different operational modes. Examples of such different timings include boarding time, flight takeoff, cruise, landing, and other suitable times in various travel stages as described in FIG. 1.

Figure 3:
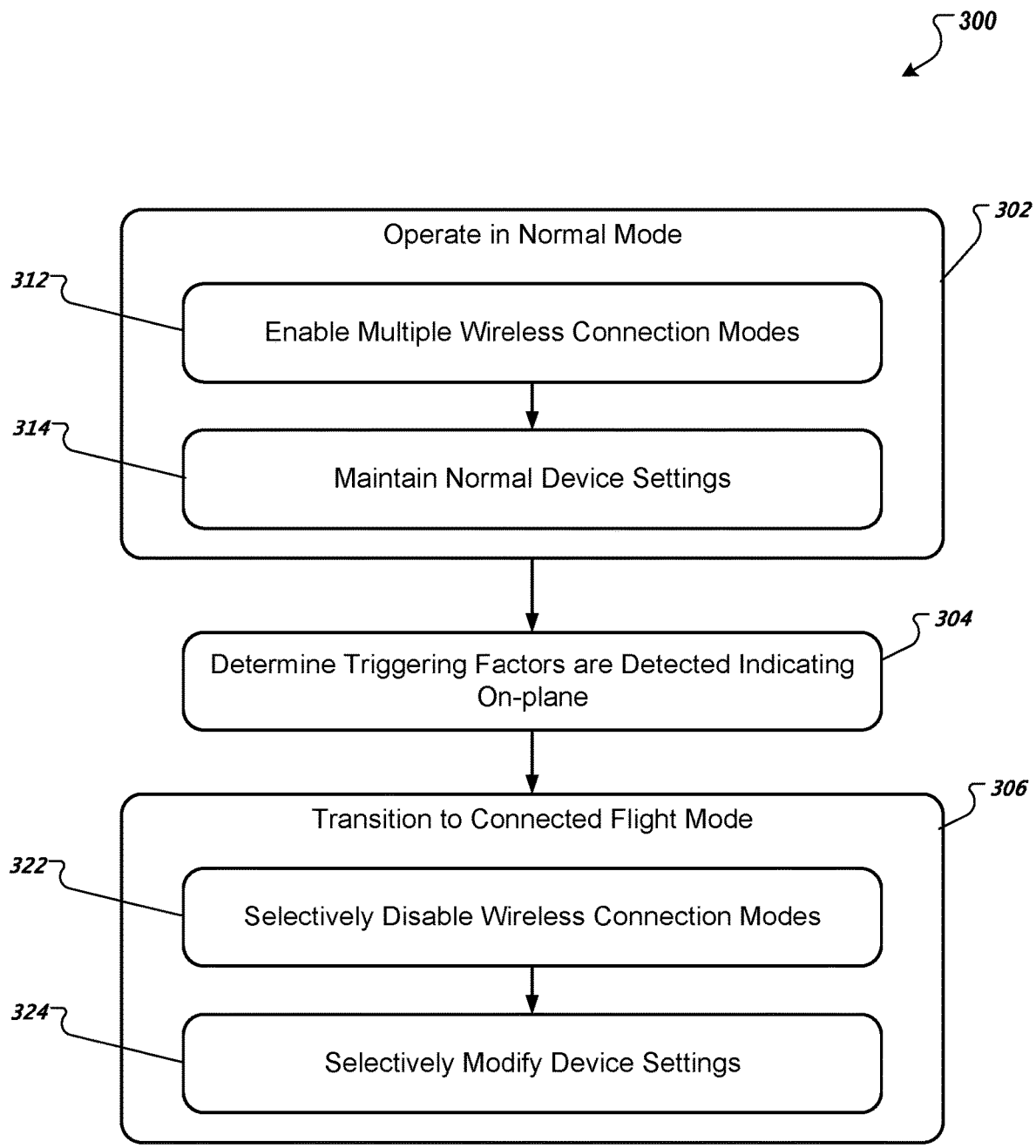
FIG. 3 is a flowchart of an example method for activating a connected flight mode.

FIG. 3 is a flowchart of an example method 300 for activating a connected flight mode. The method 300 may begin at operation 302 of operating a portable computing device in the normal mode 120.

In some implementations, the normal mode is run (box 302) by enabling multiple wireless connection modes (box 312). For example, a portable computing device is capable of establishing different modes of wireless connections, such as cellular, Wi-Fi, Bluetooth, and NFC, and all the wireless connection modes are enabled when the portable computing device is in the normal mode.

In addition or alternatively, the normal mode is run (box 302) by maintaining normal device settings (box 314). For example, the operating system (OS) and the applications installed on the portable computing device are capable of running in their full functionalities and without limitations on network connectivity, data usage, background process, etc.

The method 300 may include determining that triggering factors are detected indicating that the portable computing device is in a predetermined status (box 304). The predetermined status can be a locational condition. For example, the predetermined status is a particular location (e.g., in an airplane), and triggering factors can be detected and analyzed to determine whether the portable computing device is in that particular location (e.g., in the airplane). Alternatively or in addition, the predetermined status can be a timing condition. For example, the predetermined status is a particular timing (e.g., takeoff) over the entire travel stage (e.g., Stages A-J in FIG. 1), and the triggering factors can be detected and analyzed to determine whether the portable computing device is at or around the particular timing (e.g., the takeoff).

The method 300 may include transitioning the normal mode to the connected flight mode 130 (box 306). The transitioning can be caused upon detecting and analyzing one or more predetermined triggering factors as described herein.

In some implementations, the connected flight mode is run (box 306) by selectively disabling the multiple wireless connection modes (box 322). For example, where a portable computing device is capable of establishing different modes of wireless connections, one or more of the wireless connection modes (e.g., cellular network mode) may be disabled to satisfy the aircraft's policy while the other wireless connection modes (e.g., Wi-Fi and Bluetooth modes) remain enabled in the connected flight mode.

In addition or alternatively, the connected flight mode is run (operation 306) by selectively modifying device settings (operation 324). For example, the settings of the operating system (OS) and the applications installed on the portable computing device can be modified to optimize access to limited network resources and achieve efficient operation of the portable computing device and the network as a whole.

Figure 4:
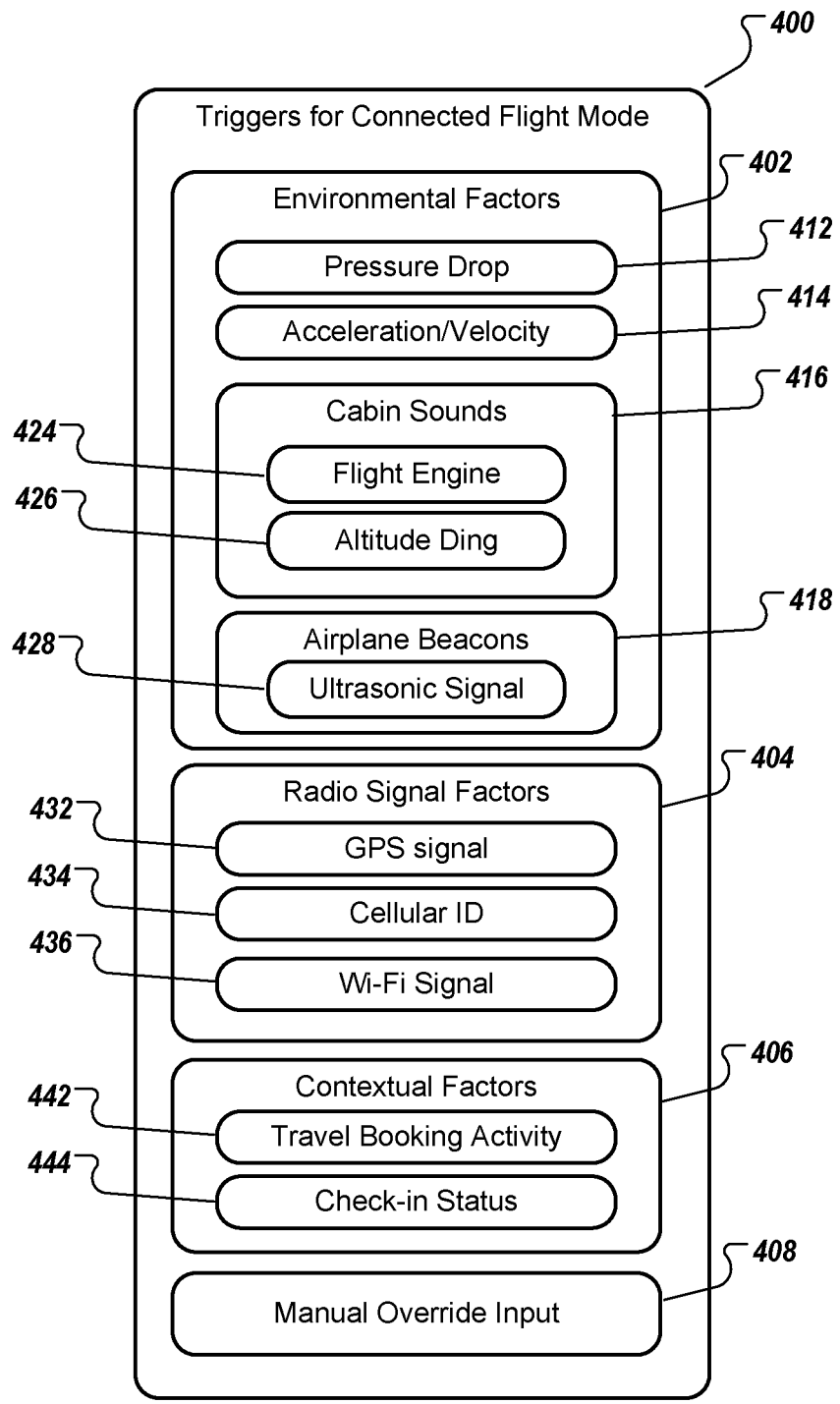
FIG. 4 is a block diagram that illustrates triggering factors for a connected flight mode.

FIG. 4 is a block diagram that illustrates factors 400 that trigger a connected flight mode on a portable computing device. The triggering factors 400 include environmental factors 402, radio signal factors 404, contextual factors 406, and manual override input 408.

The environmental factors 402 indicate environmental measurements associated with, or around, the portable computing device 102. The environmental factors 402 can be detected by one or more sensors and evaluated to determine whether they show characteristics sufficient to activate the connected flight mode. The environmental factors 402 include pressure 412, acceleration/velocity 414, cabin sounds 416, and airplane beacons 418.

The pressure 412 can be an atmospheric pressure around the portable computing device and can be measured by a barometer, altimeter, or other sensors included in, or connected to, the portable computing device 102. Alternatively, the portable computing device 102 can receive the atmospheric pressure from a remote sensor or device that operates to detect the atmospheric pressure.

The pressure 412 being measured drops as the aircraft, in which the portable computing device is located, takes off until reaching a cruising altitude. Thus, a pressure drop obtained from the detection of the pressure 412 can be used to determine whether the airplane is taking off and thus the portable computing device should switch to the flight connected mode. In some implementations, the pressure 412 is monitored over time, so that a rate of pressure change (e.g., pressure drop) over time can be obtained. The pressure change rate may be useful to distinguish flight takeoff from other climbing movements, such as driving, biking, or hiking up to the mountain or other climbing activities that have a pressure change rate that is significantly slower than the pressure drop during takeoff.

In some implementations, the pressure 412 that has been obtained can be compared with a predetermined pressure threshold. If the pressure 412 drops below the predetermined pressure threshold, the portable computing device 102 determines that it becomes in a situation that needs to transition to the connected flight mode. For example, the predetermined pressure threshold may be around 870 hPa. Alternatively or in addition, a rate of change in the pressure 412 is calculated and compared with a predetermined threshold to determine whether the pressure varies (e.g., drops) fast enough to consider the portable computing device 102 to be in a situation (e.g., takeoff) that should switch to the connected flight mode.

The acceleration and/or velocity 414 can indicate an acceleration and/or speed (with or without its direction) of the portable computing device or of a user or vehicle that carries the portable computing device. The acceleration and/or velocity 414 can be measured by an accelerometer, speedometer, gyroscope, odometer, and other suitable sensors included in, or connected to, the portable computing device. Alternatively, the portable computing device can receive the acceleration and/or velocity from a remote sensor or device that operates to detect the acceleration and/or velocity of a user or vehicle carrying the portable computing device.

The acceleration and/or velocity 414 being measured can increase at least in part of a takeoff phase of the aircraft. Thus, an acceleration and/or velocity increase identified from the detection of the acceleration and/or velocity 414 can be used to determine whether the airplane is taking off and thus the portable computing device should switch to the flight connected mode. The acceleration and/or velocity 414 that have been obtained can be compared with a predetermined threshold. If the acceleration and/or velocity 414 increase above the predetermined threshold, the portable computing device 102 determines that it becomes in a situation that needs to transition to the connected flight mode.

The cabin sounds 416 may include various sounds that may suggest the location of the portable computing device. For example, certain sounds can indicate that the portable computing device is in an aircraft cabin, and/or that the aircraft carrying the portable computing device is in particular phases of flight (e.g., taxiing, about to take off, taking off, cruising, about to descend, descent, and landing). Examples of such sounds include engine sounds 424 and specific sounds or chimes 426 played within the aircraft cabin to indicate that particular events have occurred or are going to occur (e.g. that the aircraft has reached altitude, the landing gear is being retracted or that the seatbelt sign is being switched off). The portable computing device 102 can use one or more microphones included therein or connected thereto to detect the cabin sounds 416.

The engine sounds 424 can indicate which phase the airplane is. For example, as described with reference to FIG. 1, an aircraft runs the engines at high power to check for any problem before takeoff, and operates the engines at full power during takeoff, thereby making distinctive noises. Further, an aircraft runs the engines at low power during descent although the aircraft may accelerate for a short period of time towards the end of the descent. Other different sounds, as described with reference to FIG. 1, may also be detected during other flight phases. As such, an aircraft makes different characteristics of noises over different phases of flight, which can be used to determine whether the portable computing device carried in the aircraft should switch the connected flight mode on and off.

The sounds or chimes 426 played within the aircraft cabin may include an "altitude ding" may be a sound that the aircraft plays over speakers to indicate that the flight has reached an altitude at which flight attendants are free to move about the cabin and/or that seatbelts can be removed.

The computing system may determine an occurrence of such a sound, and in response transition to a connected flight mode.

The airplane beacons 418 can also be used to indicate whether a portable computing device is in or near an airplane, and/or which flight phase the airplane is in. An airplane can include one or more beacons for various purposes, such as preventing collision, alerting others to potential hazard, and transmitting airplane location for emergency. The beacons may be of various types, some configured to emit acoustic signals, such as ultrasonic signals 428, in various embodiments. Therefore, the portable computing device can determine that it is located in or near an airplane by detecting such acoustic signals (e.g., ultrasonic signals 428) emitted from the airplane beacons 418.

Referring still to FIG. 4, the triggering factors 400 may include the radio signal factors 404 that can indicate data relating to and/or obtained from radio-frequency communications from or to the portable computing device 102. The data associated with various radio-frequency connections established with the portable computing device 102 can be used to identify the location and/or movement of the portable computing device 102.

For example, the portable computing device 102 can receive GPS signals 432, and analyze the GPS signals to determine an altitude and/or speed of the portable computing device 102, and/or a change in the altitude and/or speed. Based on the altitude and/or speed, and/or the change thereof, the portable computing device 102 can infer that the portable computing device 102 is located in an airplane, determine the flight phase the airplane is in, and determine to switch on and off the connected flight mode.

Further, the portable computing device 102 can transmit and receive cellular signals 434 from multiple cellular base transceiver stations. As a vehicle (e.g., airplane) carrying the portable computing device 102 moves, the portable computing device 102 moves across different cell areas covered by different base stations, and receives cellular signals having different cell IDs that each identity the base stations. The portable computing device 102 can analyze such different cell IDs, and determine where it is approximately located based on the cell IDs, and/or how fast it is moving based on how fast the cell IDs change over time. Based on these data, the portable computing device 102 can infer that the portable computing device 102 is located in an airplane, determine the flight phase the airplane is in, and determine whether to switch on and off the connected flight mode.

Moreover, the portable computing device 102 can detect Wi-Fi signals 436 from different routers or other networking sources. When an aircraft provides an inflight Wi-Fi service, the portable computing device 102 can detect Wi-Fi signals from an aircraft router when the portable computing device 102 falls in the coverage of the router. Thus, when receiving such inflight Wi-Fi signals, the portable computing device 102 can infer that the portable computing device 102 is located in an airplane, and determine whether to switch on and off the connected flight mode.

Referring still to FIG. 4, the triggering factors 400 can include contextual factors 406 from which the portable computing device 102 can predict and/or infer its location relative to an airplane and a flight phase of the airplane. For example, the contextual factors 406 include one or more user's travel booking activities 442, such as activities of reserving flights, hotels, rentals, and restaurants in different locations. The travel booking activities 442 can be obtained from various sources. For example, a user of the computing device can provide permission for the portable computing device 102 to monitor and analyze user's activities via applications running on the portable computing device 102 to determine a context of the device. The information about the activities, such as times, locations, and other booking information, can be used to infer and/or predict the user's locations and/or flight statuses at particular times, which can be used to determine whether and when to switch on and off the connected flight mode.

In addition, the contextual factors 406 can include the user's check-in status 444 that indicates whether and when the user has checked in for the flight. Similarly to the user's activity monitoring, the portable computing device 102 can detect the user's check-in status by monitoring and analyzing the user's interactions with applications on the portable computing device, and use the user's check-in status to determine whether and when to turn on and off the connected flight mode.

Referring still to FIG. 4, the triggering factors 400 can include a manual override input 408 by a user. The manual override input 408 enables user input to manually select the connected flight mode and at least partially override automatic transition from and to the connected flight mode. In addition, the manual override input 408 may include one or more user input elements to configure settings or actions predetermined for the connected flight mode. The portable computing device 102 provides a user interface (e.g., control elements such as toggle buttons) to enable a user to manually turn on and off the connected flight mode and/or modify specific settings or actions in the connected flight mode. In some implementations, the computing device 102 does not automatically transition into a connected flight mode, and a primary or only way to activate the connected flight mode is to select input 408.

In some implementations, a machine learning model can be used to improve detection and analysis of the triggering factors 400 and determination of switching to and from connected flight mode. The machine learning model can be trained by a training subsystem including a plurality of computing devices having software and/or hardware modules that build one or more statistical models. In addition or alternatively, a new knowledge graph is built, and/or an existing knowledge graph is used and updated, to improve the detection and analysis of the triggering factors 400 and the determination of transitioning to and from the connected flight mode.

Further to the descriptions above, a user may be provided with controls allowing the user to make an election as to both if and when systems, programs, or features described herein may enable collection of user information (e.g., information about any of a pressure drop (box 412), acceleration/velocity (box 414), cabin sounds (box 416), airplane beacons (box 418), radio signal factors (box 404), and contextual factors (box 406)). Even if some such features are enabled, the computing device may not send any such information to a remote computing system, and may perform all analysis of such information locally on the computing device. Thus, the user may have control over what information is collected about the user and how that information is used. A user may also disable the ability of the computing device to automatically enter a connected flight mode and all contextual analysis that is performed in relation thereto.

FIG. 5 is a block diagram that illustrates events 500, one or more of which may occur in a connected flight mode 130 on a portable computing device 102. The events 500 include one or more settings that are configured or modified, and one or more actions that are taken, in the connected flight mode 130. The events 500 may include wireless connection controls 502, application controls 504, phone controls 506, cache controls 508, and user assistant controls 510. The events 500 may include other settings, actions, controls, etc.

The wireless connection controls 502 include selective controls of multiple radio-frequency connection modes on the portable computing device 102. Instead of disabling all the radio-frequency connection modes, in the connected flight mode, the portable computing device 102 can selectively disable one or more of the radio-frequency connection modes while continuing to enable the other radio-frequency connection modes.

In the connected flight mode, the portable computing device disables the cellular connection mode although it can selectively enable or disable other modes of wireless connections (box 512).

In addition, the portable computing device 102 may selectively control the Wi-Fi connection mode (box 514). Depending on a flight phase of the airplane carrying the portable computing device, the portable computing device can turn on and off the Wi-Fi connection mode. In some implementations, if it is determined that the airplane is in a takeoff phase or a descent phase, the portable computing device can disable the Wi-Fi connection mode until the airplane is determined to enter a cruising phase or a landing phase. During the cruising or landing phase, the portable computing device can connect to an inflight Wi-Fi provided in the airplane. In other implementations, the portable computing device can maintain the Wi-Fi connection mode to be enabled over the entire flight or travel.

In some implementations, the portable computing device in the connected flight mode disables a Wi-Fi auto join function (box 516) so that the user must manually select a Wi-Fi network the user wants to join. When the Wi-Fi auto join is disabled, the portable computing device can provide the user with a notification to prompt the user to select a Wi-Fi network to join, or to confirm a Wi-Fi network that the portable computing device suggests.

In addition or alternatively, the portable computing device in the connected flight mode can disconnect from a Wi-Fi network earlier than it would in the normal mode (box 518). For example, if the portable computing device is connected to an inflight Wi-Fi network in the connected flight mode, the portable computing device can monitor a quality of the link or connection that is available via the Wi-Fi network and disconnect from the inflight Wi-Fi network if the signal quality becomes lower than a threshold value that is different (e.g., lower) than a threshold value in the normal mode. Such actions (e.g., boxes 516 and 518) to selectively control the Wi-Fi connection can avoid spotty Wi-Fi connections and reduce instances of applications being unresponsive due to frequent disconnection or poor signal strength. The quality of the link or connection that is available through the Wi-Fi network may be determined based on one or more of: the signal strength of the inflight Wi-Fi connection, a data transmission rate available over the connection, a signal-to-noise ratio associated with the link or connection, etc.

In some implementations, the portable computing device can provide a different captive portal in the connected flight mode than the one in the normal mode. For example, the captive portal in the connected flight mode permits a shorter time for a user to log in with credentials. If the log in is not completed within such a shorter time, the inflight Wi-Fi will be disconnected, thereby using more aggressive Wi-Fi network dropoff as necessary. This can reduce the number of devices that attach to a Wi-Fi network but are not actively being used.

The wireless connection controls 502 can include selective control of GPS connection mode in the connected flight mode (box 520). In some implementations, if the GPS connection mode has been enabled in the normal mode, the portable computing device 102 keeps the GPS connection mode enabled in the connected flight mode. In other implementations, the portable computing device 102 disables the GPS connection mode in the connected flight mode.

The wireless connection controls 502 can include enabling of Bluetooth connection mode in the connected flight mode (box 522). The portable computing device 102 keeps the Bluetooth connection mode enabled in the connected flight mode if the Bluetooth connection mode has been enabled in the normal mode. Alternatively, the portable computing device 102 can disable the Bluetooth connection mode temporarily or throughout the connected flight mode.

The wireless connection controls 502 can include disabling tethering on the portable computing device 102 in the connected flight mode (box 524). With tethering is disabled, the portable computing device 102 is not used to share its Internet connection with other computing devices connected to the portable computing device 102 (e.g., wirelessly with the computing device 102 operating as a Wi-Fi access point). Alternatively, the portable computing device 102 can have tethering enabled temporarily or throughout the connected flight mode.

The wireless connection controls 502 can prioritize use of local resources over Internet resources. In some instances where the portable computing device 102 or an application on the portable computing device 102 can be served either by local sources such as local cached data (e.g., movies or other media contents stored in an inflight entertainment system) or by external resources (e.g., same moves or media contents available on Internet), the portable computing device 102 changes its settings to flavor the local resources over the external resources. For example, if the portable computing device 102 needs to install an application to access inflight entertainment contents, the portable computing device 102 downloads the application from a local resource (e.g., intranet), rather than an external resource (e.g., Internet).

Referring still to FIG. 5, the events 500 may include the application controls 504. The application controls 504 include selective controls of settings for an operating system (OS) and/or one or more applications running on the portable computing device 102 to reduce overall data communications and optimize data usage among different applications.

In the connected flight mode, the portable computing device 102 disables application updates (box 532). The portable computing device 102 can disable all or some background services, such as OS background services, application background services, and other updates that may run in the background. In some implementations, the portable computing device 102 allows a user to selectively turn on at least one of the disabled background services as needed.

In addition or alternatively, the portable computing device 102 can disable cloud backup (box 534). The portable computing device 102 can disable all or some backup services that are programmed to be automatically performed in the normal mode. In some implementations, however, the portable computing device 102 allows a user to selectively turn on at least one of the disabled backup services as needed.

In addition or alternatively, the portable computing device 102 can switch to a restricted data mode (or a data saver mode) (box 536). In such a restricted data mode, the portable computing device 102 prevents one or more applications running on the device from sending or receiving data in the background (e.g., when an application does not have focus and a graphical interface therefore is not occupying a display of the portable computing device 102). The applications that are currently running may still use mobile data, but may change to request mobile data less frequently. For example, in the restricted data mode, images may not be shown until after they are tapped.

In addition or alternatively, the portable computing device 102 can disable a background app refresh (box 538) which would otherwise allow applications to refresh their content in the background so that the applications can always display new content whenever opened. In the connected flight mode, the portable computing device 102 can operate to update the content in the applications only when permitted by a user.

In addition or alternatively, the portable computing device 102 can enable one or more generic data reduction services (e.g., Android's Data Saver and Flywheel) (box 540).

Referring still to FIG. 5, the events 500 may include the phone controls 506. The phone controls 506 include selective controls of settings for phone features and other general features of the portable computing device 102.

In the connected flight mode, the portable computing device 102 enables an automatic response system (e.g., Auto-Reply) which operates to automatically respond to phone calls and text messages (box 544) by sending a text message or voice message. In addition, the portable computing device 102 can automatically generate a message (e.g., "Can't respond. I'm on a plane") that will be sent to callers or senders of text messages.

In addition or alternatively, the portable computing device 102 can switch to a silent mode (box 546). The silent mode disables ringtones and, in some cases, vibrating alerts or alarms.

In addition or alternatively, the portable computing device 102 can optimize battery usage (box 548). The portable computing device 102 changes one or more settings of the OS and/or applications to reduce battery usage while being in the connected flight mode. In some implementations, however, the portable computing device 102 can maintain the settings that may affect the battery usage after transitioning to the connected flight mode, if the portable computing device 102 is connected to an external power source (e.g., electrical outlet, USB, and portable battery pack) and being supplied electrical power.

Referring still to FIG. 5, the events 500 may include the cache controls 508. The cache controls 508 includes selective controls of caches for applications running on the portable computing device 102 to enhance their operations in limited network environments on the plane.

In the connected flight mode, the portable computing device 102 can prioritize use of cached data over downloading via a network (box 552). In addition or alternatively, the portable computing device 102 can disable clearing cached data to promote use of the cached data (box 554). In addition or alternatively, the portable computing device 102 can expand cache size to cache more data (box 556).

Referring still to FIG. 5, the events 500 may include the user assistant controls 510 that improve user assistant features on the portable computing device 102. In the connected flight mode, the portable computing device 102 can provide information that results in the connected flight mode to user assistant applications, such as virtual assistant apps (e.g., Google Assistant, Siri, Amazon Alexa, etc.) and knowledge graphs, so that such other applications can provide improved services to the user. In addition or alternatively, other information associated with the user's flight, which may be obtained by the portable computing device 102 and/or other remote devices (e.g., devices of the airplane), can be shared with the applications. The user assistant applications that are fed with the information can beware the user's itinerary (e.g., user's drastic change in location) and the user's presence on the plane, and provide appropriate service to the user on the plane and during the travel. For example, when the user's presence on the plane is determined, the user assistant applications can suggest opening inflight entertainment applications, or automatically launch the inflight entertainment applications, to help consume inflight entertainment contents. In other examples, as the plane approaches the destination or has landed at the destination, the user assistant applications can provide travel information that likely helps the user's subsequent travel.

In some implementations, the events 500 may selectively occur to provide a connected flight mode suitable for the type, status or condition of a particular portable computing device, suitable for a particular phase of flight, and/or suitable for one or more triggering factors detected. In other implementations, all the events 500 may occur at the same time for a connected flight mode.

In some implementations, at least one of the events 500 may be particularly related to at least one of the triggering factors 400 so that detection of a particular triggering factor 400 can cause a particular event to happen in a connected flight mode. Further, different types of computing devices may have different needs and thus may have one or more different events to occur in their respective connected flight modes.

In some implementations, the portable computing device maintains an active cellular connection after determining that the portable computing device is located on a flight, for example, because the portable computing device may have connected to a nanocell on board the plane or may be able to connect to such a nanocell. In such implementations, the portable computing device may not deactivate any wireless communications responsive to determining that the portable computing device is located on a flight, but may implement the other actions described in this document (e.g., blocking backups or application updates, changing cache configurations, etc.).

Figure 6:
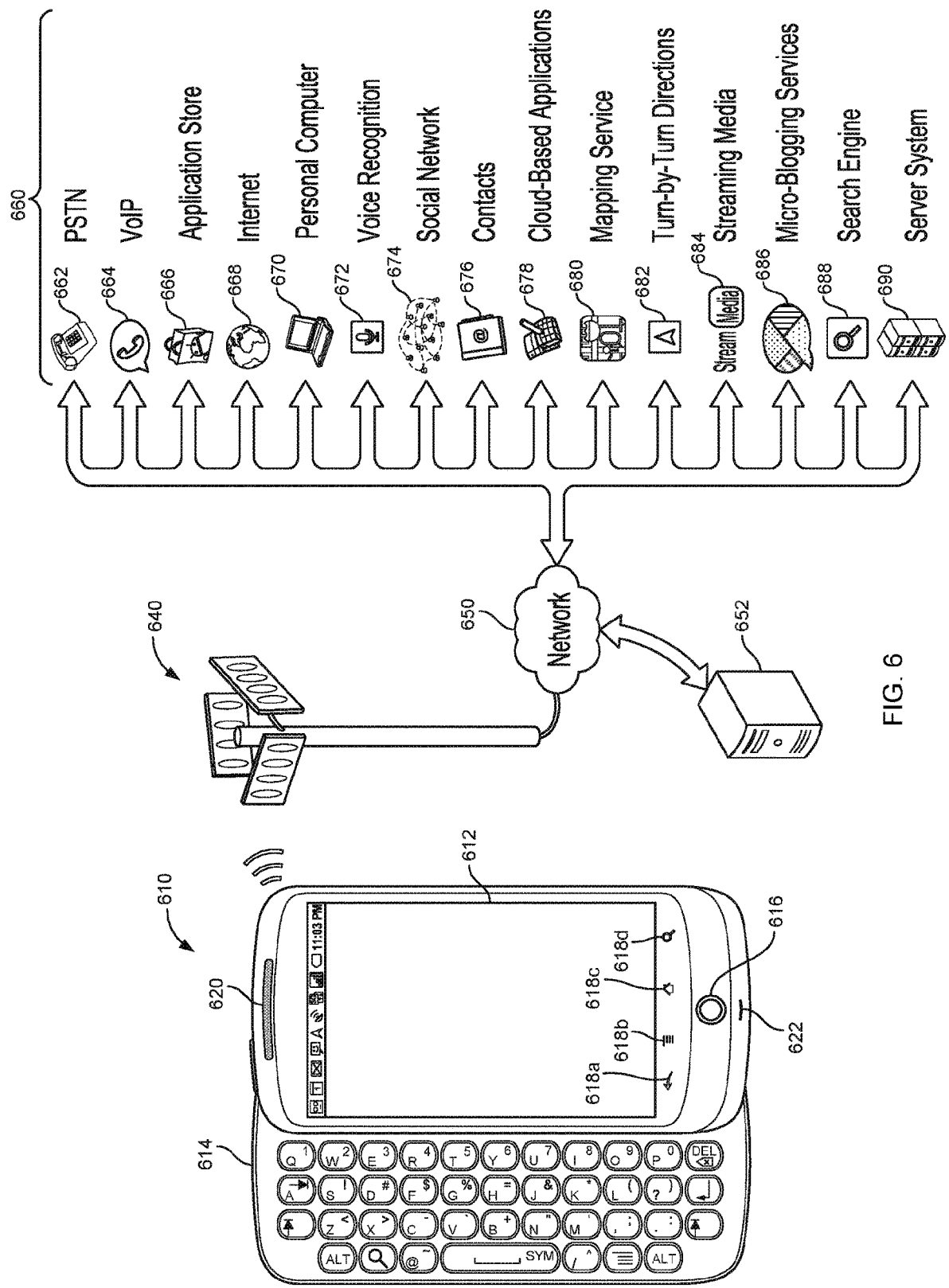
FIG. 6 is a conceptual diagram of a system that may be used to implement the systems and methods described in this document.

Referring now to FIG. 6, a conceptual diagram of a system that may be used to implement the systems and methods described in this document is illustrated. In the system, mobile computing device 610 can wirelessly communicate with base station 640, which can provide the mobile computing device wireless access to numerous hosted services 660 through a network 650.

In this illustration, the mobile computing device 610 is depicted as a handheld mobile telephone (e.g., a smartphone, or an application telephone), but the mobile computing device 610 may be a mobile computing device other than a mobile telephone, such as a laptop computing device, a tablet computing device, or a wearable computing device (e.g., a smartwatch). The mobile computing device includes a touchscreen display device 612 for presenting content to a user of the mobile computing device 610 and receiving touch-based user inputs and/or presence-sensitive user input (e.g., as detected over a surface of the computing device using radar detectors mounted in the mobile computing device 510). Other visual, tactile, and auditory output components may also be provided (e.g., LED lights, a vibrating mechanism for tactile output, or a speaker for providing tonal, voice-generated, or recorded output), as may various different input components (e.g., keyboard 614, physical buttons, trackballs, accelerometers, gyroscopes, and magnetometers).

Example visual output mechanism in the form of display device 612 may take the form of a display with resistive or capacitive touch capabilities. The display device may be for displaying video, graphics, images, and text, and for coordinating user touch input locations with the location of displayed information so that the device 610 can associate user contact at a location of a displayed item with the item. The mobile computing device 610 may also take alternative forms, including as a laptop computer, a tablet or slate computer, a personal digital assistant, an embedded system (e.g., a car navigation system), a desktop personal computer, or a computerized workstation.

An example mechanism for receiving user-input includes keyboard 614, which may be a full qwerty keyboard or a traditional keypad that includes keys for the digits '0-9', '*', and '#.' The keyboard 614 receives input when a user physically contacts or depresses a keyboard key. User manipulation of a trackball 616 or interaction with a track pad enables the user to supply directional and rate of movement information to the mobile computing device 610 (e.g., to manipulate a position of a cursor on the display device 612).

The mobile computing device 610 may be able to determine a position of physical contact with the touchscreen display device 612 (e.g., a position of contact by a finger or a stylus). Using the touchscreen 612, various "virtual" input mechanisms may be produced, where a user interacts with a graphical user interface element depicted on the touchscreen 612 by contacting the graphical user interface element. An example of a "virtual" input mechanism is a "software keyboard," where a keyboard is displayed on the touchscreen and a user selects keys by pressing a region of the touchscreen 612 that corresponds to each key.

The mobile computing device 610 may include mechanical or touch sensitive buttons 618a-d. Additionally, the mobile computing device may include buttons for adjusting volume output by the one or more speakers 620, and a button for turning the mobile computing device on or off. A microphone 622 allows the mobile computing device 610 to convert audible sounds into an electrical signal that may be digitally encoded and stored in computer-readable memory, or transmitted to another computing device. The mobile computing device 610 may also include a digital compass, an accelerometer, proximity sensors, and ambient light sensors.

An operating system may provide an interface between the mobile computing device's hardware (e.g., the input/output mechanisms and a processor executing instructions retrieved from computer-readable medium) and software. Example operating systems include ANDROID, CHROME OS, IOS, MAC OS X, WEAR OS, WINDOWS 7, WINDOWS PHONE 7, SYMBIAN, BLACKBERRY, WEBOS, a variety of UNIX operating systems; or a proprietary operating system for computerized devices. The operating system may provide a platform for the execution of application programs that facilitate interaction between the computing device and a user.

The mobile computing device 610 may present a graphical user interface with the touchscreen 612. A graphical user interface is a collection of one or more graphical interface elements and may be static (e.g., the display appears to remain the same over a period of time), or may be dynamic (e.g., the graphical user interface includes graphical interface elements that animate without user input).

A graphical interface element may be text, lines, shapes, images, or combinations thereof. For example, a graphical interface element may be an icon that is displayed on the desktop and the icon's associated text. In some examples, a graphical interface element is selectable with user-input. For example, a user may select a graphical interface element by pressing a region of the touchscreen that corresponds to a display of the graphical interface element. In some examples, the user may manipulate a trackball to highlight a single graphical interface element as having focus. User-selection of a graphical interface element may invoke a pre-defined action by the mobile computing device. In some examples, selectable graphical interface elements further or alternatively correspond to a button on the keyboard 604. User-selection of the button may invoke the pre-defined action.

In some examples, the operating system provides a "desktop" graphical user interface that is displayed after turning on the mobile computing device 610, after activating the mobile computing device 610 from a sleep state, after "unlocking" the mobile computing device 610, or after receiving user-selection of the "home" button 618c. The desktop graphical user interface may display several graphical interface elements that, when selected, invoke corresponding application programs. An invoked application program may present a graphical interface that replaces the desktop graphical user interface until the application program terminates or is hidden from view.

User-input may influence an executing sequence of mobile computing device 610 operations. For example, a single-action user input (e.g., a single tap of the touchscreen, swipe across the touchscreen, contact with a button, or combination of these occurring at a same time) may invoke an operation that changes a display of the user interface. Without the user-input, the user interface may not have changed at a particular time. For example, a multi-touch user input with the touchscreen 612 may invoke a mapping application to "zoom-in" on a location, even though the mapping application may have by default zoomed-in after several seconds.

The desktop graphical interface can also display "widgets." A widget is one or more graphical interface elements that are associated with an application program that is executing, and that display on the desktop content controlled by the executing application program. A widget's application program may launch as the mobile device turns on. Further, a widget may not take focus of the full display. Instead, a widget may only "own" a small portion of the desktop, displaying content and receiving touchscreen user-input within the portion of the desktop.

The mobile computing device 610 may include one or more location-identification mechanisms. A location-identification mechanism may include a collection of hardware and software that provides the operating system and application programs an estimate of the mobile device's geographical position. A location-identification mechanism may employ satellite-based positioning techniques, base station transmitting antenna identification, multiple base station triangulation, internet access point IP location determinations, inferential identification of a user's position based on search engine queries, and user-supplied identification of location (e.g., by receiving user a "check in" to a location).

The mobile computing device 610 may include other applications, computing sub-systems, and hardware. A call handling unit may receive an indication of an incoming telephone call and provide a user the capability to answer the incoming telephone call. A media player may allow a user to listen to music or play movies that are stored in local memory of the mobile computing device 610. The mobile device 610 may include a digital camera sensor, and corresponding image and video capture and editing software. An internet browser may enable the user to view content from a web page by typing in an addresses corresponding to the web page or selecting a link to the web page.

The mobile computing device 610 may include an antenna to wirelessly communicate information with the base station 640. The base station 640 may be one of many base stations in a collection of base stations (e.g., a mobile telephone cellular network) that enables the mobile computing device 610 to maintain communication with a network 650 as the mobile computing device is geographically moved. The computing device 610 may alternatively or additionally communicate with the network 650 through a Wi-Fi router or a wired connection (e.g., ETHERNET, USB, or FIREWIRE). The computing device 610 may also wirelessly communicate with other computing devices using BLUETOOTH protocols, or may employ an ad-hoc wireless network.

A service provider that operates the network of base stations may connect the mobile computing device 610 to the network 650 to enable communication between the mobile computing device 610 and other computing systems that provide services 660. Although the services 660 may be provided over different networks (e.g., the service provider's internal network, the Public Switched Telephone Network, and the Internet), network 650 is illustrated as a single network. The service provider may operate a server system 652 that routes information packets and voice data between the mobile computing device 610 and computing systems associated with the services 660.

The network 650 may connect the mobile computing device 610 to the Public Switched Telephone Network (PSTN) 662 in order to establish voice or fax communication between the mobile computing device 610 and another computing device. For example, the service provider server system 652 may receive an indication from the PSTN 662 of an incoming call for the mobile computing device 610. Conversely, the mobile computing device 610 may send a communication to the service provider server system 652 initiating a telephone call using a telephone number that is associated with a device accessible through the PSTN 662.

The network 650 may connect the mobile computing device 610 with a Voice over Internet Protocol (VoIP) service 664 that routes voice communications over an IP network, as opposed to the PSTN. For example, a user of the mobile computing device 610 may invoke a VoIP application and initiate a call using the program. The service provider server system 652 may forward voice data from the call to a VoIP service, which may route the call over the internet to a corresponding computing device, potentially using the PSTN for a final leg of the connection.

An application store 666 may provide a user of the mobile computing device 610 the ability to browse a list of remotely stored application programs that the user may download over the network 650 and install on the mobile computing device 610. The application store 666 may serve as a repository of applications developed by third-party application developers. An application program that is installed on the mobile computing device 610 may be able to communicate over the network 650 with server systems that are designated for the application program. For example, a VoIP application program may be downloaded from the Application Store 666, enabling the user to communicate with the VoIP service 664.

The mobile computing device 610 may access content on the internet 668 through network 650. For example, a user of the mobile computing device 610 may invoke a web browser application that requests data from remote computing devices that are accessible at designated universal resource locations. In various examples, some of the services 660 are accessible over the internet.

The mobile computing device may communicate with a personal computer 670. For example, the personal computer 670 may be the home computer for a user of the mobile computing device 610. Thus, the user may be able to stream media from his personal computer 670. The user may also view the file structure of his personal computer 670, and transmit selected documents between the computerized devices.

A voice recognition service 672 may receive voice communication data recorded with the mobile computing device's microphone 622, and translate the voice communication into corresponding textual data. In some examples, the translated text is provided to a search engine as a web query, and responsive search engine search results are transmitted to the mobile computing device 610.

The mobile computing device 610 may communicate with a social network 674. The social network may include numerous members, some of which have agreed to be related as acquaintances. Application programs on the mobile computing device 610 may access the social network 674 to retrieve information based on the acquaintances of the user of the mobile computing device. For example, an "address book" application program may retrieve telephone numbers for the user's acquaintances. In various examples, content may be delivered to the mobile computing device 610 based on social network distances from the user to other members in a social network graph of members and connecting relationships. For example, advertisement and news article content may be selected for the user based on a level of interaction with such content by members that are "close" to the user (e.g., members that are "friends" or "friends of friends").

The mobile computing device 610 may access a personal set of contacts 676 through network 650. Each contact may identify an individual and include information about that individual (e.g., a phone number, an email address, and a birthday). Because the set of contacts is hosted remotely to the mobile computing device 610, the user may access and maintain the contacts 676 across several devices as a common set of contacts.

The mobile computing device 610 may access cloud-based application programs 678. Cloud-computing provides application programs (e.g., a word processor or an email program) that are hosted remotely from the mobile computing device 610, and may be accessed by the device 610 using a web browser or a dedicated program. Example cloud-based application programs include GOOGLE DOCS word processor and spreadsheet service, GOOGLE GMAIL webmail service, and GOOGLE PHOTOS picture manager.

Mapping service 680 can provide the mobile computing device 610 with street maps, route planning information, and satellite images. An example mapping service is GOOGLE MAPS. The mapping service 680 may also receive queries and return location-specific results. For example, the mobile computing device 610 may send an estimated location of the mobile computing device and a user-entered query for "pizza places" to the mapping service 680. The mapping service 680 may return a street map with "markers" superimposed on the map that identify geographical locations of nearby "pizza places."

Turn-by-turn service 682 may provide the mobile computing device 610 with turn-by-turn directions to a user-supplied destination. For example, the turn-by-turn service 682 may stream to device 610 a street-level view of an estimated location of the device, along with data for providing audio commands and superimposing arrows that direct a user of the device 610 to the destination.

Various forms of streaming media 684 may be requested by the mobile computing device 610. For example, computing device 610 may request a stream for a pre-recorded video file, a live television program, or a live radio program. Example services that provide streaming media include YOUTUBE and PANDORA.

A micro-blogging service 686 may receive from the mobile computing device 610 a user-input post that does not identify recipients of the post. The micro-blogging service 686 may disseminate the post to other members of the micro-blogging service 686 that agreed to subscribe to the user.

A search engine 688 may receive user-entered textual or verbal queries from the mobile computing device 610, determine a set of internet-accessible documents that are responsive to the query, and provide to the device 610 information to display a list of search results for the responsive documents. In examples where a verbal query is received, the voice recognition service 672 may translate the received audio into a textual query that is sent to the search engine.

These and other services may be implemented in a server system 690. A server system may be a combination of hardware and software that provides a service or a set of services. For example, a set of physically separate and networked computerized devices may operate together as a logical server system unit to handle the operations necessary to offer a service to hundreds of computing devices. A server system is also referred to herein as a computing system.

In various implementations, operations that are performed "in response to" or "as a consequence of" another operation (e.g., a determination or an identification) are not performed if the prior operation is unsuccessful (e.g., if the determination was not performed). Operations that are performed "automatically" are operations that are performed without user intervention (e.g., intervening user input). Features in this document that are described with conditional language may describe implementations that are optional. In some examples, "transmitting" from a first device to a second device includes the first device placing data into a network for receipt by the second device, but may not include the second device receiving the data. Conversely, "receiving" from a first device may include receiving the data from a network, but may not include the first device transmitting the data.

"Determining" by a computing system can include the computing system requesting that another device perform the determination and supply the results to the computing system. Moreover, "displaying" or "presenting" by a computing system can include the computing system sending data for causing another device to display or present the referenced information.

Figure 7:
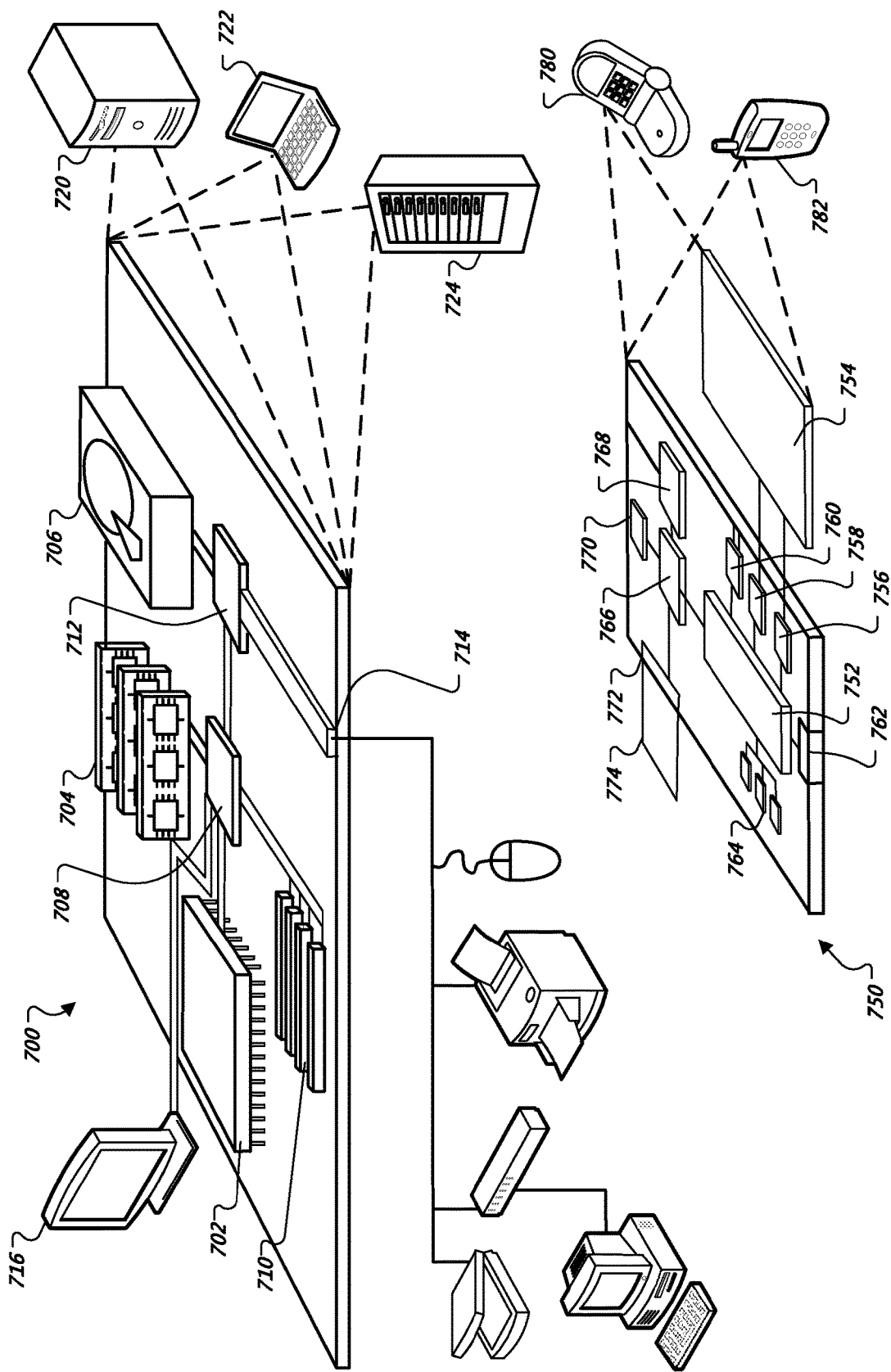
FIG. 7 is a block diagram of computing devices that may be used to implement the systems and methods described in this document, as either a client or as a server or plurality of servers.

FIG. 7 is a block diagram of computing devices 700, 750 that may be used to implement the systems and methods described in this document, as either a client or as a server or plurality of servers. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smartphones, and other similar computing devices. The components shown here, their connections and relationships, and their functions, are meant to be examples only, and are not meant to limit implementations described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high-speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, or memory on processor 702.

The high-speed controller 708 manages bandwidth-intensive operations for the computing device 700, while the low speed controller 712 manages lower bandwidth-intensive operations. Such allocation of functions is an example only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. Additionally, the processor may be implemented using any of a number of architectures. For example, the processor may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT (Thin-Film-Transistor Liquid Crystal Display) display or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provide in communication with processor 752, so as to enable near area communication of device 750 with other devices. External interface 762 may provided, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may also include secure information also. Thus, for example, expansion memory 774 may be provide as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752 that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smartphone 782, personal digital assistant, or other similar mobile device.

Additionally computing device 700 or 750 can include Universal Serial Bus (USB) flash drives. The USB flash drives may store operating systems and other applications. The USB flash drives can include input/output components, such as a wireless transmitter or USB connector that may be inserted into a USB port of another computing device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for performing the systems and methods described in this document may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method, comprising:
    establishing, by a mobile computing device, a first wireless connection with a cellular network while a cellular connection mode of the mobile computing device is activated;
    establishing, by the mobile computing device, a second wireless connection with a wirelessly-communicating device while a second wireless connection mode of the mobile computing device is activated, wherein the second wireless connection with the wirelessly-communicating device is a Wi-Fi wireless connection;
    determining, by the mobile computing device while the cellular connection mode remains activated and the second wireless connection mode remains activated, that a sensor of the mobile computing device has detected information indicating that the mobile computing device is located on an airplane; and
    transitioning, by the mobile computing device in response to having determined that the sensor has detected information indicating that the mobile computing device is located on the airplane, the mobile computing device into a connected flight mode, including by terminating the cellular connection mode while allowing the Wi-Fi wireless connection mode to remain activated, and
    wherein the transitioning of the mobile computing device into the connected flight mode comprises transitioning the mobile computing device from a state in which the Wi-Fi wireless connection is automatically disconnected if a quality of connection available via the Wi-Fi wireless connection is below a first threshold value, to a state in which the Wi-Fi wireless connection is automatically disconnected if a quality of connection available via the Wi-Fi wireless connection is below a second threshold value that is different from the first threshold value.

2. The computer-implemented method of claim 1, wherein:
    the sensor includes a pressure sensor; and
    determining that the sensor of the mobile computing device has detected information indicating that the mobile computing device is located on the airplane includes the mobile computing device detecting an atmospheric pressure being lower than a predetermined threshold value.

3. The computer-implemented method of claim 1, wherein the transitioning of the mobile computing device into the connected flight mode comprises transitioning the mobile computing device from a state in which automatic application backups are permitted to a state in which the automatic application backups are not permitted.

4. The computer-implemented method of claim 1, wherein the transitioning of the mobile computing device into the connected flight mode comprises transitioning the mobile computing device from a state in which automatic background application refresh is permitted to a state in which the automatic background application refresh is not permitted.

5. The computer-implemented method of claim 1, wherein the transitioning of the mobile computing device into the connected flight mode comprises transitioning the mobile computing device from a state in which automatic application updates are permitted to a state in which the automatic application updates are not permitted.

6. The computer-implemented method of claim 1, further comprising:
    establishing, by the mobile computing device, a third wireless connection with another wirelessly-communicating device while a third wireless connection mode of the mobile computing device is activated, wherein the third wireless connection with the other wirelessly-communicating device is a Bluetooth wireless connection, and
    wherein the transitioning of the mobile computing device into the connected flight mode comprises allowing the Bluetooth wireless connection mode to remain activated.

7. The computer-implemented method of claim 1, wherein the transitioning of the mobile computing device into the connected flight mode comprises transitioning the mobile computing device from a state in which a captive portal for log-in is provided for a first period of time on the mobile computing device, to a state in which the captive portal for log-in is provided for a second period of time that is shorter than the first period of time, wherein the mobile computing device disconnects the Wi-Fi wireless connection after the second period of time while the mobile computing device is in the connected flight mode.

8. The computer-implemented method of claim 1, further comprising:
   determining, by the mobile computing device in the connected flight mode, that the sensor of the mobile computing device has detected information indicating that the mobile computing device is located off the airplane; and
   transitioning, by the mobile computing device in response to having determined that the sensor detected information indicating that the mobile computing device is located off the airplane, the mobile computing device into a normal mode, including by enabling the cellular connection mode while leaving the second wireless connection mode activated.

9. The computer-implemented method of claim 8, further comprising:
   receiving, by the mobile computing device, a user input to switch the mobile computing device from the normal mode to the connected flight mode.

10. A computing system, comprising:
    one or more processors; and
    one or more computer-readable devices including instructions that, when executed by the one or more processors, cause the computerized system to perform operations that include:
        establishing, by a mobile computing device, a first wireless connection with a cellular network while a cellular connection mode of the mobile computing device is activated;
        establishing, by the mobile computing device, a second wireless connection with a wirelessly-communicating device while a second wireless connection mode of the mobile computing device is activated, wherein the second wireless connection with the wirelessly-communicating device is a Wi-Fi wireless connection;
        determining, by the mobile computing device while the cellular connection mode remains activated and the second wireless connection mode remains activated, that a sensor of the mobile computing device has detected information indicating that the mobile computing device is located on an airplane; and
        transitioning, by the mobile computing device in response to having determined that the sensor has detected information indicating that the mobile computing device is located on the airplane, the mobile computing device into a connected flight mode, including by terminating the cellular connection mode while allowing the Wi-Fi wireless connection mode to remain activated, and
        wherein the transitioning of the mobile computing device into the connected flight mode comprises transitioning the mobile computing device from a state in which the Wi-Fi wireless connection is automatically disconnected if a quality of connection available via the Wi-Fi wireless connection is below a first threshold value, to a state in which the Wi-Fi wireless connection is automatically disconnected if a quality of connection available via the Wi-Fi wireless connection is below a second threshold value that is different from the first threshold value.

11. The computing system of claim 10, wherein:
    the sensor includes a pressure sensor; and
    determining that the sensor of the mobile computing device has detected information indicating that the mobile computing device is located on the airplane includes the mobile computing device detecting an atmospheric pressure being lower than a predetermined threshold value.

12. The computing system of claim 10, wherein the transitioning of the mobile computing device into the connected flight mode comprises transitioning the mobile computing device from a state in which automatic application backups are permitted to a state in which the automatic application backups are not permitted.

13. The computing system of claim 10, wherein the transitioning of the mobile computing device into the connected flight mode comprises transitioning the mobile computing device from a state in which automatic background application refresh is permitted to a state in which the automatic background application refresh is not permitted.

14. The computing system of claim 10, wherein the transitioning of the mobile computing device into the connected flight mode comprises transitioning the mobile computing device from a state in which automatic application updates are permitted to a state in which the automatic application updates are not permitted.

15. The computing system of claim 10, wherein the transitioning of the mobile computing device into the connected flight mode comprises transitioning the mobile computing device from a state in which a captive portal for log-in is provided for a first period of time on the mobile computing device, to a state in which the captive portal for log-in is provided for a second period of time that is shorter than the first period of time, wherein the mobile computing device disconnects the Wi-Fi wireless connection after the second period of time while the mobile computing device is in the connected flight mode.

16. The computing system of claim 10, wherein the operations further comprise:
    determining, by the mobile computing device in the connected flight mode, that the sensor of the mobile computing device has detected information indicating that the mobile computing device is located off the airplane; and
    transitioning, by the mobile computing device in response to having determined that the sensor detected information indicating that the mobile computing device is located off the airplane, the mobile computing device into a normal mode, including by enabling the cellular connection mode while leaving the second wireless connection mode activated.

17. The computing system of claim 16, wherein the operations further comprise:
    receiving, by the mobile computing device, a user input to switch the mobile computing device from the normal mode to the connected flight mode.

18. The computing system of claim 10, further comprising:
    establishing, by the mobile computing device, a third wireless connection with another wirelessly-communicating device while a third wireless connection mode of the mobile computing device is activated, wherein the third wireless connection with the other wirelessly-communicating device is a Bluetooth wireless connection, and wherein the transitioning of the mobile computing device into the connected flight mode comprises allowing the Bluetooth wireless connection mode to remain activated.

19. The computer-implemented method of claim 1, wherein the detected information comprises a cabin sound indicative of an occurrence of a flight event based on one or more of: (i) an engine sound, or (ii) a cabin chime.

20. The computer-implemented method of claim 19, wherein the detected information comprises a cabin sound indicative of a phase of flight, and wherein the phase of flight comprises one of: taxiing, about to take off, taking off, cruising, about to descend, descending, or landing.

21. The computer-implemented method of claim 1, wherein the detected information comprises an acoustic signal from an airplane beacon, and the sensor is an acoustic sensor configured to detect the acoustic signal.

22. The computer-implemented method of claim 1, wherein the detected information comprises a radio signal factor comprising one or more GPS signals, and wherein the determining that the mobile computing device has detected information indicating that the mobile computing device is located on the airplane further comprises:
   determining, for the mobile computing device and based on the one or more GPS signals, one or more of an altitude, a speed, a change in altitude, or a change in speed.

23. The computer-implemented method of claim 1, wherein the detected information comprises a radio signal factor comprising one or more cellular signals associated with an identity of a respective base station, and wherein the determining that the mobile computing device has detected information indicating that the mobile computing device is located on the airplane further comprises:
   determining, based on the one or more cellular signals, one or more of (i) an approximate location of the mobile computing device based on the identity of the respective base station, or (ii) a speed of the mobile computing device based on a rate of change of identities of respective base stations.

24. The computer-implemented method of claim 1, wherein the detected information comprises a contextual factor comprising one or more of (i) a travel reservation activity associated with a user of the mobile computing device, or (ii) a flight check-in activity associated with the user.

25. The computer-implemented method of claim 24, further comprising:
   determining the contextual factor based on one or more user activities via an application running on the mobile computing device.

26. The computer-implemented method of claim 1, wherein the sensor comprises one or more of an accelerometer, a gyroscope, a magnetometer, a GPS receiver, an altimeter, an odometer, a speedometer, a shock detector, a vibration sensor, or a proximity sensor.

27. A non-transitory computer readable medium having program instructions stored thereon that are executable by a processor to perform functions comprising:
   establishing, by a mobile computing device, a first wireless connection with a cellular network while a cellular connection mode of the mobile computing device is activated;
   establishing, by the mobile computing device, a second wireless connection with a wirelessly-communicating device while a second wireless connection mode of the mobile computing device is activated, wherein the second wireless connection with the wirelessly-communicating device is a Wi-Fi wireless connection;
   determining, by the mobile computing device while the cellular connection mode remains activated and the second wireless connection mode remains activated, that a sensor of the mobile computing device has detected information indicating that the mobile computing device is located on an airplane; and
   transitioning, by the mobile computing device in response to having determined that the sensor has detected information indicating that the mobile computing device is located on the airplane, the mobile computing device into a connected flight mode, including by terminating the cellular connection mode while allowing the Wi-Fi wireless connection mode to remain activated, and
   wherein the transitioning of the mobile computing device into the connected flight mode comprises transitioning the mobile computing device from a state in which the Wi-Fi wireless connection is automatically disconnected if a quality of connection available via the Wi-Fi wireless connection is below a first threshold value, to a state in which the Wi-Fi wireless connection is automatically disconnected if a quality of connection available via the Wi-Fi wireless connection is below a second threshold value that is different from the first threshold value.

* * * * *